United States Patent Office 3,056,659
Patented Oct. 2, 1962

3,056,659
PHOSPHORUS PRODUCTION
Joseph C. Yarze, Union, and Heinz G. Friedrich, Maplewood, N.J., assignors to The M. W. Kellogg Company, Jersey City, N.J., a corporation of Delaware
No Drawing. Filed Feb. 26, 1960, Ser. No. 11,123
16 Claims. (Cl. 23—223)

This invention relates to the production of phosphorus and more particularly, to the production of phosphorus or phosphoric acid from phosphatic materials. Still more particularly, the invention relates to the production of elemental phosphorus, and subsequently phosphoric acid, from phosphate rock by a novel method of pyrolysis and reduction treatments.

Prior to our invention, phosphoric acid was produced commercially by two principal processes. In the so-called "wet process," phosphate rock is digested with sulfuric acid to produce a solution of phosphoric acid containing a suspension of finely divided calcium sulfate. This solution is filtered and then concentrated by evaporation to provide the desired concentration of phosphoric acid. It has been found, however, that the acid produced in this manner is not suitable in instances in which phosphoric acid of a high degree of purity is desired, since it usually contains varying quantities of deleterious impurities, particularly calcium sulfate. These impurities are especially troublesome where the phosphoric acid is used in commercial liquid fertilizers, inasmuch as they tend to form deposits in the nozzles employed for applying the fertilizer. Thus, because of the difficulty encountered in purifying phosphoric acid produced by the "wet process" for use in liquid fertilizers or other commercial applications, acid produced by this process is seldom employed for the above purposes.

Another commercial method for the production of phosphoric acid resides in the use of the electric furnace which provides a means for producing elemental phosphorus of an improved degree of purity. In the electric furnace process, elemental phosphorus is produced by the reduction of phosphate rock with metallurgical coke in an electric furnace. Phosphorus thus produced is separated from the furnace gases by condensation, and is then burned to produce phosphorus pentoxide which is hydrated to phosphoric acid. While phosphoric acid produced by the electric furnace process is of improved purity for such purposes as the preparation of liquid fertilizers and for incorporation in various feed products, it nevertheless has the disadvantage of being extremely expensive to produce by the aforementioned method because of the large quantities of electric power which are required to operate the furnace.

Another method that has been suggested for the production of phosphorus is one in which the phosphate rock is first sintered to make it porous in nature so that it might lend itself to an impregnation treatment for the deposition of carbon thereon. Thereafter, the phosphate rock is carbon-coated by cracking a hydrocarbon in its presence, and then the phosphate material is heated in order to reduce it to the elemental phosphorus. In this process, a fixed bed operation is employed. The difficulty encountered in carrying out this method, however, resides in the fact that there is obtained a coalescence or sticking of the phosphate rock particles in both the cracking or pyrolysis zone and also in the subsequent reduction zone. This coalescence of the phosphate rock particles results in the inability to obtain a substantially complete carbon-coating of the rock particles so that they may be subsequently effectively reduced. Furthermore, the subsequent coalescence in the reduction zone also renders it impossible to carry out the substantially complete reduction of the coated phosphate rock to produce elemental phosphorus in a high yield. Hence, prior to our invention, no satisfactory method has been obtained for the efficient and economic production of elemental phosphorus from phosphate rock or from phosphatic materials.

It is, therefore, an object of this invention to provide an improved process for the production of phosphorus.

Another object of the invention is to provide an improved process for the production of elemental phosphorus from phosphate rock or other phosphatic materials.

Still another object of the invention is to provide an improved process for the production of elemental phosphorus, and subsequently phosphoric acid, in an efficient and economical manner and in a high yield.

Other objects and advantages inherent in the invention will become apparent to those skilled in the art from the accompanying description and disclosure.

In accordance with the present invention, a novel process has been provided for the production of phosphorus, as more fully hereinafter discussed, which comprises, in general, a two-stage method of applying a fluid technique to effectively deposit carbon on the phosphate rock particles in such manner that there is obtained no coalescence of these particles, or a reduction of the rock in a cracking or pyrolysis zone; and thereafter, the thus-coated rock particles are heated in a reduction zone at substantially high temperatures at which the phosphate rock particles would otherwise coalesce but for the condition of the rock particles and the environment maintained in this zone, to effect a reduction of the phosphate rock, with the production of elemental phosphorus, as a product of the process. The critical features of the present process, as more fully hereinafter discussed, reside in the specific temperature conditions which are maintained in the pyrolysis and in the reduction zones, and in the presence of a critical quantity of silica in the phosphate rock particles undergoing treatment in the reduction zone to permit reduction of the fluidized coated rock particles to occur at the temperatures maintained in the reduction zone, and in the carrying out of the reduction treatment in the presence of a fluidizable carbonaceous material as a diluent, to prevent agglomeration and sticking of the rock particles.

Specifically, the above results are obtained by flowing a fluid hydrocarbon through a pyrolysis or cracking zone which contains a mass of finely divided phosphate rock particles in order to maintain these particles in a fluidized condition, and also as a source of carbon for effecting a coating of the phosphate rock particles. The temperatures maintained in this pyrolysis or cracking zone are such as are effective to cause cracking of the fluid hydrocarbon with the deposition of carbon on the rock particles, but below the temperatures at which these particles would coalesce and at which they would be reduced to phosphorus. In this respect, it has been found that a criticality of the operating temperatures employed exists with respect to the relationship of the coating operation conducted in the pyrolysis zone and that of the subsequent operation conducted in the reduction zone. It has been found, in fluidized operations, that the mere coating of the phosphate rock particles with carbon does not, in each instance, satisfy the requirements for carrying out a successful reduction operation in the reduction zone, in order to obtain elemental phosphorus in good yield. In this respect, it has been found that if the coating operation is conducted at a temperature below approximately 1400° F., in the pyrolysis zone, insufficient carbon is laid down on the rock particles to make subsequent reduction possible from a practical standpoint. On the other hand, if the coating operation in the pyrolysis zone is conducted at a temperature above approximately 2100° F., the carbon, coating the rock particles, is not rendered sufficiently reactive for subsequent reduction to take place in the reduction zone at temperatures necessary to maintain fluidized conditions. Thus, it has been found that the temperatures maintained, for effectively carrying out the coating operation in the pyrolysis zone, under fluidized conditions, are between about 1400° F. and about 2100° F. Optimum results, from an economic standpoint, are obtained by conducting the cracking of the fluid hydrocarbon at temperatures between about 1750° F. and about 1950° F.

In carrying out the subsequent reduction treatment under fluidized conditions, it has been found that the reduction zone must be maintained at a temperature of at least approximately 2200° F. If the reduction operation is conducted at a temperature below approximately 2200° F., the reduction proceeds at such a low rate that for practical purposes no appreciable quantities of elemental phosphorus are obtainable. On the other hand, if the reduction operation is conducted at a temperature above approximately 2600° F., fluidization conditions are difficult to maintain because of the relatively high temperatures that are utilized. Thus, it has been found that operable temperatures to be maintained in the reduction zone for effectively carrying out the reduction operation, under fluidized conditions, are between about 2200° F. and about 2600° F. The optimum results, from an economic standpoint, are obtained by conducting the reduction operation at temperatures between about 2300° F. and about 2500° F. From the above, it will become apparent that the relationship of the temperature conditions maintained during the coating operation, which is conducted in the pyrolysis zone, is critical and of prime importance with respect to the temperature conditions maintained in the subsequent reduction treatment, where the pyrolysis and the reduction treatments are each sought to be carried out under fluidized conditions. The pressure which is maintained in both the cracking and the reduction zones is preferably between about 0 and about 20 p.s.i.g. The actual operating conditions employed, will, of course, be dependent upon many factors and may vary widely within the above ranges, without departing from the scope of the invention. It will be noted, furthermore, that by operating within the ranges indicated above, the coalescence of the coated phosphate rock particles within the reduction zone, which would otherwise take place except for the coating of carbon thereon, is avoided and elemental phosphorus is readily produced as a product of the process.

The phosphate rock, which is employed as the starting material in accordance with the present invention, will normally be in the form of fluorapatite, $Ca_{10}(PO_4)_6F_2$. This phosphate rock will normally contain varying quantities of other substances, such as aluminum oxide and iron oxide. Suitable phosphate rock is found, for example, in certain parts of Florida, Tennessee and Idaho, as well as in various other locations both in the United States and abroad. The phosphate rock, which is employed in the process of the present invention, should be in a range of particle sizes suitable for fluidization, so that the process can be carried out by maintaining fluidized beds in the respective cracking and reduction zones. Particles having an average diameter from about 30 microns to ¼ inch, more usually, between about 100 to about 250 mesh, are normally preferred. However, rock particles of other sizes which can be subjected to fluidization may also be employed without departing from the scope of the invention. The hydrocarbon which is employed in carrying out the cracking operation, as indicated above, is in the fluid state, i.e., it may be a gaseous or liquid hydrocarbon. Preferably, the hydrocarbon is employed in the form of a normally gaseous hydrocarbon or a gaseous material, such as natural gas (methane) containing substantial quantities of one or more normally gaseous hydrocarbons. The fluidized gas employed in the reduction zone may comprise nitrogen, hydrogen, mixtures of hydrogen and methane and mixtures of hydrogen and nitrogen.

In a preferred embodiment of the invention, the fluidized bed in the cracking zone preferably has a density between about 25 and about 60 pounds per cubic foot, and a superficial linear gas velocity between about 0.5 and about 2 feet per second. The density of the fluid bed in the reduction zone is preferably between about 25 and about 60 pounds per cubic foot, and the superficial linear gas velocity is preferably between about 0.4 and about 2 feet per second. The average residence time of the fluid hydrocarbon in the cracking zone is preferably between about 10 and about 60 seconds, while the residence time of the coated phosphate rock particles in the reduction zone is preferably between about 1 and about 8 hours, when the preferred temperatures are employed. In general, it is preferred to preheat the fluid hydrocarbon, usually to about 1000° F., before being introduced into the cracking zone. It will be understood, of course, that the velocities, densities and residence times, stated above, may be employed outside of the preferred ranges, without departing from the scope of the invention. If desired, additional gas, or other fluidizing media, may be injected into the system, wherever necessary, to aid in transporting the fluidized material within the process, or as a fluidizing or stripping gas.

The operating conditions described above are such as will result in obtaining a high degree of cracking of the fluid hydrocarbon in the cracking or pyrolysis zone, with substantially no reduction of the phosphate rock particles taking place within this zone. The particles of phosphate rock which thus become coated with carbon, are then transferred to the reduction zone, where the above-described conditions are adapted for the efficient reduction of the phosphate rock, employing the deposited carbon as the reducing agent. It has been found that by producing carbon, within the cracking zone, and allowing it to become deposited on the individual particles of the phosphate rock, as described above, there is little or no tendency for the rock particles to agglomerate or stick. In this connection, it will be noted that if the particles of phosphate rock would otherwise tend to agglomerate, the equipment would become completely fouled by slag and would be incapable of operating for any substantial length of time. Particles of phosphate rock, which are not coated with carbon, have been found to exhibit a strong tendency to coalesce at the above-mentioned reduction temperature, apart from the other causes hereinafter discussed. In order to assure that agglomeration or sticking of the phosphate rock particles does not take place insofar as the carbon-coating requirements are concerned, it is preferred to operate the process under conditions such that carbon is produced in some excess of the amount actually required to be deposited for complete reduction to take place of the calcium phosphate to phosporus and carbon monoxide.

Theoretically, the reaction which is carried out in the reduction zone may be presented as follows:

$$Ca_3(PO_4)_2 + 5C \rightarrow 3CaO + P_2 + 5CO$$

In this respect, it has been found that the presence of silica, in the phosphate rock, as more fully hereinafter discussed, fluxes the rock particles so that the actual reaction which probably takes place may be represented as follows:

$$Ca_3(PO_4)_2 + 3SiO_2 + 5C \rightarrow 3(CaO \cdot SiO_2) + P_2 + 5CO$$

The above reactions have only been indicated for purposes of explanation, and it should be understood that the process of the present invention is not necessarily limited to these systems in which the above reactions take place.

Apart from the critical requirements of the present process, in which the specific temperature conditions described above must be maintained in the pyrolysis and reduction zones, a further critical requirement resides in maintaining a specific quantity of silica in the phosphate rock particles undergoing treatment. In this respect, it has been found that the presence of silica in the rock particles is necessary so that the silica may react with the lime (CaO), resulting from the reduction of the calcium phosphate, to flux the rock particles and to permit the reduction to occur at relatively high rates at the above-mentioned temperatures maintained in the reduction zone under fluidized conditions. For this purpose, it has been found that a silica to lime ratio of at least 0.2 by weight must be present. For optimum results, silica to lime ratios of about 0.2 to about 1.5 by weight are generally preferred. The silica, required to be incorporated in the rock, may be in any suitable form, e.g., in the form of silicon dioxide, in the quantity desired.

As indicated above, in addition to the critical temperature requirements to be maintained in the pyrolysis and reduction zones and the requirement for maintaining a specific silica-content in the phosphate rock particles undergoing treatment, the reduction treatment is carried out in the presence of a fluidizable carbonaceous material which functions as a diluent. This material has the effect of diluting the phosphate rock particles so that rock-to-rock contact is avoided or significantly minimized. Such dilution results in preventing the aforementioned agglomeration of the rock particles and "sticking" in the reduction zone which would otherwise impede or prevent the maintaining of fluid conditions during the reduction operation. For this purpose, any fluidizable carbonaceous material may be employed as a diluent. Particularly useful are the commercially available forms of fluid coke, which is normally obtained as a by-product when converting low-value crude oils and residual oils to more valuable products, such as naphtha, gas-oil and low molecular weight gases.

The fluidizable carbonaceous material, e.g., fluid coke, used as a diluent in the present process is generally employed in an amount of at least 10% by weight based upon the total quantity of phosphate rock present in the reduction zone and may be employed in greater quantities, if so desired; such increased quantities being limited by the size of the reduction zone. Preferably, the diluent is employed in an amount between about 25% and about 75% by weight based upon the total quantity of phosphate rock present in the reduction zone. The diluent should be in a range of particle sizes suitable for fluidization. Particles having an average diameter from about 30 microns to ¼ inch, more usually between about 100 to about 250 mesh are normally preferred. However, particles of other sizes which can be subjected to fluidization may also be employed.

The fluidizable carbonaceous material, employed as a diluent, e.g., fluid coke, is usually derived, as indicated above and contain some volatile hydrocarbons which, upon heating, would produce some quantities of carbon, thereby coating the rock particles with a relatively inactive carbon and impeding the reduction rate. It is, therefore, preferred to remove these volatile compounds from the diluent prior to its addition to the phosphate rock particles. For this purpose, the diluent is preferably heated to temperatures sufficiently high to drive off the volatile materials. These temperatures need not be higher than about 200° F. over those which are maintained in the reduction zone. The diluent may be added to the phosphate rock particles either by being introduced separately into the reduction zone or may be combined with the coated phosphate rock particles as they are withdrawn from the pyrolysis zone, and prior to their transfer to the reduction zone.

The aforementioned pyrolysis and reduction treatments of the phosphate rock particles may be carried out in several ways. In accordance with one modification of the present process, a mass of phosphate rock was introduced into a reaction zone which is equipped with heat exchange means adapted to permit the passage of gaseous combustion products, e.g., flue gas, therethrough. The mass of phosphate rock is then passed into the reaction zone in contact with the heat exchange means. A fluid hydrocarbon, e.g., methane, is then introduced upwardly into the cracking zone or pyrolysis zone, and into contact with the mass of phosphate rock particles. The heat exchange means in the pyrolysis zone is maintained at a temperature which is sufficient to heat the phosphate rock particles to a temperature within the aforementioned range of about 1400° F. to about 2100° F. so that the hydrocarbon is cracked and carbon thus-formed will coat the phosphate rock particles, which temperature is below the level at which the phosphate rock particles would otherwise coalesce. This modification is more fully described in co-pending applications Serial No. 600,287, filed July 26, 1956, and Serial No. 5,860, filed Feb. 1, 1960, in the names of Warren C. Schreiner and Donald E. Loudon, and is therefore believed to require no further elaboration. Thereafter, the coated phosphate rock particles are passed to the reduction zone, in combination with the diluent in the desired quantity, and are heated at a temperature within the aforementioned range of about 2200° F. to about 2600° F. to reduce the phosphate rock to elemental phosphorus.

In another modification of the improved process of the present invention, preheated inert solids are introduced into the cracking or pyrolysis zone to come into contact with the fluidized mass of phosphate rock particles, to maintain this mass at the desired temperature which is effective to cause cracking of the fluid hydrocarbon with deposition of carbon on the phosphate rock particles. Following the aforementioned cracking treatment, the coated phosphate rock particles, and the added diluent, in the desired quantity, are also contacted with preheated inert solids in the reduction zone to heat these coated particles to a temperature within the aforementioned reduction temperature range to reduce the coated particles and to produce elemental phosphorus as a product of the process. A more complete description of this modification of the present process, but without the presence of the diluent in the reduction zone, is described in co-pending application Serial No. 855,785, filed November 27, 1959, in the names of Warren C. Schreiner and Donald E. Loudon, which also includes additional modifications of this method, and is believed to require no further elaboration. These latter modifications, as set forth in Serial No. 855,785, include utilization of flue gas from the process as a source of heat for preheating the aforementioned inert solids in either or both the cracking and reduction zones; and also include the modification of introducing a mass of finely-divided phosphate rock into the cracking zone together with a fluid hydrocarbon as a carrier and as an aditional source for carbon production. Another portion of the fluid hydrocarbon is flowed upwardly into the cracking zone to maintain the phosphate rock in a fluidized condition, and also to act as a primary source for depositing carbon on the rock particles. An additional modification resides in combining the above two modifications in which flue gas is employed as a source for heating inert solids, and the fluid hydrocarbon is employed in a dual capacity of acting as a carrier and also as a source for depositing carbon upon the rock particles.

The following examples will serve to illustrate the improved process of the present invention, but are not intended as being limiting thereof. In these examples, the effect of fluid-coke as a diluent in avoiding sticking of the coated phosphate rock particles in the reduction zone was observed in both fixed-bed (Examples 1 and 2) and fluid-bed (Examples 3 and 4) operations. In each instance, the reduction operation was carried out both with (Examples 2 and 4) and without (Examples 1 and 3) the presence of fluid-coke as a diluent. In each of the examples, Florida phosphate rock was employed and ground to the mesh indicated, together with silicia in the necessary amount to adjust the silica/CaO weight ratio to 0.85. The silica-containing rock particles were then fluidized in a fluidized reactor, comprising a quartz tube, by the passage of a natural gas therethrough, comprising essentially methane, at a temperature of 1800° F. This gas was cracked and resulted in the deposition of carbon upon the rock particles. The amount of carbon deposited on the rock particles was in the amount of approximately 145% by weight of the stoichiometric requirements. The coated rock particles were then transferred to a plumbago crucible (for the fixed-bed operations, as in Examples 1 and 2) or to a quartz or graphite reactor (for the fluid-bed operations, as in Examples 3 and 4). Prior to the transfer of the coated rock particles to the respective reduction operations, fluid-coke was added, in the amounts indicated, representing approximately 10% by weight of the total adjusted phosphate rock present. In the fixed-bed reduction operation, the crucible and its contents were placed in an electrically heated furnace maintained under an inert atmosphere (nitrogen) and heated to and maintained at 2600° F. for a period of 1 hour. In the fluid-bed reduction operation, the coated rock particles were transferred to a graphite reactor, which was placed in an electrically heated furnace and maintained at a temperature of 2350° F. for the respective periods of time indicated. In instances where the fluid-coke was not present, the phosphate rock particles sintered together during the reduction operation; whereas in instances in which the fluid-coke was present, it was found that the mixture was free-flowing.

| Example | 1 | 2 | 3 | 4 |
|---|---|---|---|---|
| Charges: | | | | |
| Carbon-coated and SiO$_2$-adjusted phosphate rock (grams) | 50 | 50 | 800 | 300. |
| Fluid coke (grams) | none | 5 | none | 33. |
| Total (grams) | 50 | 55 | 800 | 333. |
| Particle Size Distribution: | | | | |
| Carbon-coated and SiO$_2$-adjusted phosphate rock (mesh)[2] | 30–70 | 30–70 | 60–200 | 30–70. |
| Fluid coke (mesh) | none | 100–230 | none | 100–230. |
| Nitrogen flow rate (s.c.f.h.) | none | none | 7.72 | 7.85. |
| Reaction temperature, °F | 2,600 | 2,600 | 2,350 | 2,350. |
| Reaction time (Min.) | 60 | 60 | 35 | 150. |
| Powder characteristics at end of reduction period | sintered | free-flowing | sintered | free-flowing. |
| Fluid bed behavior at end of reduction period | | | defluidized bed | satisfactory fluidization. |
| Percent P$_2$O$_5$ removal | 100 [1] | 96.1 [1] | 48.5 [2] | 94.8.[2] |

[1] Based on P$_2$O$_5$ content in charge and weight loss.
[2] Based on solid analysis before and after reduction.

While a particular embodiment of the process of the present invention has been described for the purpose of illustration, it should be understood that various modifications and adaptations thereof, which will be obvious to those skilled in the art may be made without departing from the spirit of the invention.

We claim:

1. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio of at least about 0.2 at a temperature above about 2200° F. and higher than that employed in said cracking zone to effect reduction of said phosphate rock with the production of elemental phosphorus.

2. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidized carbonaceous material and in the presence of silica and calcium oxide in a ratio between about 0.2 and about 1.5 at a temperature above about 2200° F. and higher than that employed in said cracking zone to effect reduction of said phosphate rock with the production of elemental phosphorus.

3. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature between about 1400° F. and 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio of at least about 0.2 at a temperature between about 2200° F. and about 2600° F. and higher than that employed in said cracking zone to effect reduction of said phosphate rock with the production of elemental phosphorus.

4. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature between about 1750° F. and about 1950° F. effective to cause cracking of hydrocarbon with deposition of carbon on said phosphate rock; passing a gas upwardly through a mass of carbon coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio of at least 0.2 at a temperature between about 2300° F. and about 2500°

F. to effect reduction of said phosphate rock with the production of elemental phosphorus.

5. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature between about 1750° F. and about 1950° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio between about 0.2 and about 1.5 at a temperature between about 2300° F. and about 2500° F. to effect reduction of said phosphate rock with the production of elemental phosphorus.

6. A process for the production of phosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio of at least 0.2 at a temperature above about 2200° F. and higher than that employed in said cracking zone to effect reduction of said phosphate rock with the production of elemental phosphorus.

7. A process for the production of phosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; heating said fluidized mass of phosphate rock in said cracking zone to maintain it at a temperature between about 1400° F. and 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio between about 0.2 and about 1.5 at a temperature between about 2200° F. and higher than that employed in said cracking zone and about 2600° F. to effect reduction of said phosphate rock with the production of elemental phosphorus.

8. A process for the production of phosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; heating said fluidized mass of phosphate rock in said cracking zone to maintain it at a temperature between about 1750° F. and about 1950° F. effective to cause cracking of hydrocarbon with deposition of carbon on said phosphate rock; passing a gas upwardly through a mass af carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material and in the presence of silica and calcium oxide in a ratio between about 0.2 and about 1.5 at a temperature between about 2300° F. and about 2500° F. to effect reduction of said phosphate rock with the production of elemental phosphorus.

9. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; heating the fluidized phosphate rock in said reduction zone without substantial coalescence of said coated particles in the presence of a fluidizable carbonaceous material and in the presence of silica and calcium oxide in a ratio of at least 0.2 at a temperature above about 2200° F. and higher than that employed in said cracking zone to effect reduction of said phosphate rock with the production of elemental phosphorus; withdrawing a gaseous product from said cracking zone comprising phosphate rock and flue gas; separating flue gas from phosphate rock thus withdrawn; and employing flue gas thus separated as a source of heat for maintaining the temperature in said cracking zone.

10. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; heating the fluidized phosphate rock in said reduction zone without substantial coalescence of said coated particles in the presence of a fluidizable carbonaceous material and in the presence of silica and calcium oxide in a ratio between about 0.2 and about 1.5 at a temperature above about 2200° F. and higher than that employed in said cracking zone to effect reduction of said phosphate rock with the production of elemental phosphorus; withdrawing a gaseous product from said cracking zone comprising phosphate rock and flue gas; separating flue gas from phosphate rock thus withdrawn; and employing flue gas thus separated as a source of heat for maintaining the temperature in said cracking zone.

11. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature between about 1400° F. and 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; heating the fluidized phosphate rock in said reduction zone without substantial coalescence of said coated particles in the presence of a fluidizable carbonaceous material and in the presence of silica and calcium oxide in a ratio between about 0.2 and about 1.5 at a temperature between about 2200° F. and higher than that employed in said cracking zone and about 2600° F. to effect reduction of said phosphate rock with the production of elemental phosphorus; withdrawing a gaseous product from said cracking zone comprising phosphate rock and flue gas; separating flue gas from phosphate rock thus withdrawn; and employing flue gas thus separated as a source of heat for maintaining the temperature in said cracking zone.

12. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature between about 1750° F. and about 1950° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; heating the fluidized phosphate rock in said reduction zone without substantial coalescence of said coated particles in the presence of a fluidizable carbonaceous material and in the presence of silica and calcium oxide in a ratio between about 0.2 and about 1.5 at a temperature between about 2300° F. and about 2500° F. to effect reduction of said phosphate rock with the production of elemental phosphorus; withdrawing a gaseous product from said cracking zone comprising phosphate rock and flue gas; separating flue gas from phosphate rock thus withdrawn; and employing flue gas thus separated as a source of heat for maintaining the temperature in said cracking zone.

13. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material in an amount of at least 10 percent by weight based upon the quantity of phosphate rock present and in the presence of silica and calcium oxide in a ratio of at least 0.2 at a temperature above about 2200° F. and higher than that employed in said cracking zone to effect reduction of said phosphate rock with the production of elemental phosphorus.

14. A process for the production of phosphorus which comprises: flowing a fluid hydrocarbon through a cracking zone containing a mass of finely divided phosphate rock to maintain said phosphate rock in a fluidized condition; heating said fluidized mass of phosphate rock in said cracking zone to maintain it at a temperature not higher than 2100° F. effective to cause cracking of hydrocarbon with deposition of carbon on said phosphate rock; passing a gas upwardly through a mass of carbon-coated phosphate rock thus obtained in a reduction zone to maintain said carbon-coated phosphate rock in a fluidized state; and heating the fluidized phosphate rock in said reduction zone without substantial coalescence of said coated particles in the presence of a fluidizable carbonaceous material in an amount between about 25 and about 75 percent by weight based upon the quantity of phosphate rock present and in the presence of silica and calcium oxide in a ratio of at least 0.2 at a temperature above about 2200° F. and higher than that employed in said cracking zone to effect reduction of said phosphate rock with the production of elemental phosphorus.

15. The process of claim 1 in which the fluid hydrocarbon comprises methane.

16. The process of claim 1 in which the fluidizable carbonaceous material comprises fluid coke.

References Cited in the file of this patent

UNITED STATES PATENTS

| | | |
|---|---|---|
| 1,422,699 | Guernsey et al. | July 11, 1922 |
| 1,818,662 | Weigel et al. | Aug. 11, 1931 |
| 1,841,071 | Waggaman et al. | Jan. 12, 1932 |
| 1,867,239 | Waggaman et al. | July 12, 1932 |
| 2,897,057 | Burgess | July 28, 1959 |

FOREIGN PATENTS

| | | |
|---|---|---|
| 378,226 | Great Britain | Aug. 11, 1932 |

OTHER REFERENCES

"Fluidization in Chem. Reactions," Kalbach, pages 105–108, Chem. Engineering, January 1947.

"Fluid Solids," page 306, Journ. of Chem. Ed. (Ad. Sec.), vol. 24, #6, June 1947.

"Fluidized Solids," pages 219, 220, 227–231, Chem. Eng., May 1953.

UNITED STATES PATENT OFFICE
CERTIFICATE OF CORRECTION

Patent No. 3,056,659            October 2, 1962

Joseph C. Yarze et al.

It is hereby certified that error appears in the above numbered patent requiring correction and that the said Letters Patent should read as corrected below.

Column 9, lines 61 and 62, and column 10, line 75, strike out "and higher that that employed in said cracking zone", each occurrence, and insert the same after "2600° F.", in column 9, line 62 and column 11, line 1, each occurrence; column 12, line 11 and 12, for "hydrocharbon" read -- hydrocarbon --.

Signed and sealed this 23rd day of April 1963.

(SEAL)
Attest:

ERNEST W. SWIDER
Attesting Officer

DAVID L. LADD
Commissioner of Patents